US012751260B2

(12) United States Patent
Wang et al.

(10) Patent No.: US 12,751,260 B2
(45) Date of Patent: Sep. 29, 2026

(54) METHOD AND IC DESIGN WITH NON-LINEAR POWER RAILS

(71) Applicant: Taiwan Semiconductor Manufacturing Co., Ltd., Hsin-Chu (TW)

(72) Inventors: Sheng-Hsiung Wang, Hsinchu County (TW); Tung-Heng Hsieh, Hsinchu County (TW); Bao-Ru Young, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 293 days.

(21) Appl. No.: 18/672,083

(22) Filed: May 23, 2024

(65) Prior Publication Data

US 2024/0312838 A1 Sep. 19, 2024

Related U.S. Application Data

(60) Continuation of application No. 18/162,841, filed on Feb. 1, 2023, now Pat. No. 11,996,329, which is a (Continued)

(51) Int. Cl.

*H10W 20/00* (2026.01)
*G06F 30/39* (2020.01)

(Continued)

(52) U.S. Cl.

CPC .......... *H10W 20/067* (2026.01); *G06F 30/39* (2020.01); *G06F 30/398* (2020.01); *H10D 89/10* (2025.01);

(Continued)

(58) Field of Classification Search

CPC ........... H10W 20/067; H10W 20/0698; H10W 20/42; H10W 20/427; H10W 20/435;

(Continued)

(56) References Cited

U.S. PATENT DOCUMENTS 6,226,560 B1 5/2001 Hama et al.
7,557,436 B2 7/2009 Mizuno et al.

(Continued)

FOREIGN PATENT DOCUMENTS

CN 105390538 A 3/2016
CN 105514083 A 4/2016

(Continued)

OTHER PUBLICATIONS

W. Maly, "Technology of the SRAM", Atlas of IC Technologies: An Introduction to VLSI Processes, 1987, pp. 295-301, The Benjamin/Cummings Publishing Company, Inc., Electrical and Computer Engineering Department, Carnegie-Mellon University.

*Primary Examiner* — Tu-Tu V Ho
(74) *Attorney, Agent, or Firm* — HAYNES AND BOONE, LLP

(57) ABSTRACT

The present disclosure provides a method for fabricating an integrated circuit (IC). The method includes receiving an IC layout having a first pattern layer that includes first source/drain (S/D) contacts and second S/D contacts, the first and second S/D contacts are spaced away from each other by a spacing along a first direction, and each of the first and second S/D contacts have elongated shapes extending lengthwise in a second direction perpendicular to the first direction. The method includes constructing a conductive feature on a second pattern layer of the IC layout, the conductive feature having an initial rectangular shape with a length and a width, the length extending along the first direction. And the method includes modifying the conductive feature to form a modified conductive feature that is (Continued)

overlapped with the first S/D contacts and distanced away from the second S/D contacts.

20 Claims, 11 Drawing Sheets

Related U.S. Application Data continuation of application No. 17/106,639, filed on Nov. 30, 2020, now Pat. No. 11,581,221, which is a continuation of application No. 16/725,013, filed on Dec. 23, 2019, now Pat. No. 10,854,512, which is a division of application No. 15/686,336, filed on Aug. 25, 2017, now Pat. No. 10,515,850.

(51) Int. Cl.

| | |
|---|---|
| ***G06F 30/398*** | (2020.01) |
| ***H10D 89/10*** | (2025.01) |
| ***H10P 74/00*** | (2026.01) |
| ***H10W 20/41*** | (2026.01) |
| ***H10W 20/42*** | (2026.01) |
| ***H10W 72/00*** | (2026.01) |
| *G06F 119/18* | (2020.01) |
| *H10D 84/90* | (2025.01) |

(52) U.S. Cl.
CPC ......... *H10P 74/23* (2026.01); *H10W 20/0698* (2026.01); *H10W 20/42* (2026.01); *H10W 20/427* (2026.01); *H10W 20/435* (2026.01); *H10W 72/00* (2026.01); *G06F 2119/18* (2020.01); *H10D 84/981* (2025.01)

(58) Field of Classification Search
CPC ...... H10W 72/00; G06F 30/398; G06F 30/39; G06F 2119/18; H10D 89/10; H10D 84/981; H10P 74/23
USPC .............................................................. 438/6
See application file for complete search history.

(56) References Cited

U.S. PATENT DOCUMENTS

| | | | | |
|---|---|---|---|---|
| 8,772,109 | B2 | 7/2014 | Colinge | |
| 8,785,285 | B2 | 7/2014 | Tsai et al. | |
| 8,816,444 | B2 | 8/2014 | Wann et al. | |
| 8,823,065 | B2 | 9/2014 | Wang et al. | |
| 8,860,148 | B2 | 10/2014 | Hu et al. | |
| 9,105,490 | B2 | 8/2015 | Wang et al. | |
| 9,236,267 | B2 | 1/2016 | De et al. | |
| 9,236,300 | B2 | 1/2016 | Liaw | |
| 9,520,482 | B1 | 12/2016 | Chang et al. | |
| 9,576,814 | B2 | 2/2017 | Wu et al. | |
| 9,679,977 | B2 | 6/2017 | Kim et al. | |
| 9,859,387 | B2 * | 1/2018 | Kim ........................ | H10D 62/60 |
| 10,515,850 | B2 | 12/2019 | Wang et al. | |
| 10,529,830 | B2 * | 1/2020 | Tapily .................. | H10D 30/024 |
| 10,685,873 | B2 * | 6/2020 | Tung ................... | H10W 20/072 |
| 10,854,512 | B2 | 12/2020 | Wang et al. | |
| 2003/0162103 | A1 | 8/2003 | Oshima et al. | |
| 2007/0049010 | A1 | 3/2007 | Burgess et al. | |
| 2010/0044757 | A1 | 2/2010 | Maekawa | |
| 2013/0095650 | A1 | 4/2013 | Shimomura | |
| 2013/0280905 | A1 | 10/2013 | Doman et al. | |
| 2015/0194427 | A1 | 7/2015 | Sengupta et al. | |
| 2015/0294056 | A1 | 10/2015 | Lin et al. | |
| 2015/0294057 | A1 | 10/2015 | Lin et al. | |
| 2016/0093603 | A1 | 3/2016 | Hsieh et al. | |

FOREIGN PATENT DOCUMENTS

| | | |
|---|---|---|
| CN | 105895578 A | 8/2016 |
| JP | 110214898 | 8/1998 |
| TW | 1559509 | 11/2016 |

* cited by examiner

308
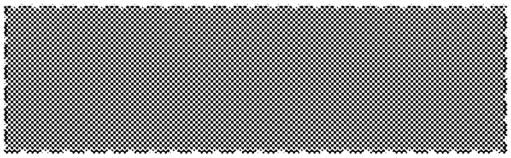
FIG. 6A
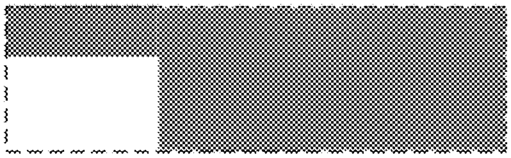
FIG. 6B
FIG. 6C
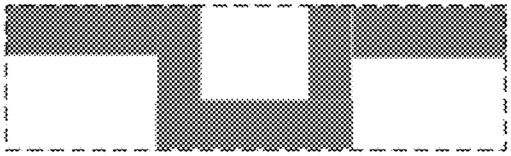
FIG. 6D
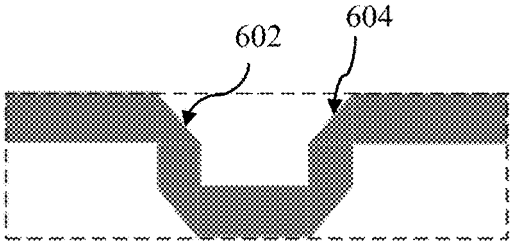
FIG. 6E
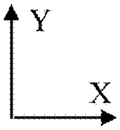

308

METHOD AND IC DESIGN WITH NON-LINEAR POWER RAILS

PRIORITY DATA

This is a continuation application of U.S. patent application Ser. No. 18/162,841, filed Feb. 1, 2023, which is a continuation application of U.S. patent application Ser. No. 17/106,639, filed Nov. 30, 2020, which is a continuation application of U.S. patent application Ser. No. 16/725,013, filed Dec. 23, 2019, which is a divisional application of U.S. patent application Ser. No. 15/686,336, filed Aug. 25, 2017, each of which is herein incorporated by reference in its entirety.

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased.

ICs may include a plurality of standard cell circuits each formed by various logic components, such as transistors, capacitors, or the like, to provide a Boolean logic function or a storage function. Interconnect structures, such as vias and power rails, are then formed over the plurality of standard cell circuits to provide connections between the standard cell circuits and/or to provide connections to external devices. However, as the size of standard cells progressively become smaller, gaps and clearance between the power rails and the other electronic components may decrease which may increase the risk of shorting. Attempts to reduce the size of the power rails, however, may suffer from increased resistance and may induce speed degradation. Accordingly, what is needed is a circuit structure and a method of making the same to address the above issues.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A, 6B, 6C, 6D and 6E are sectional views of the conductive via feature in the semiconductor structure of FIG. 4 at various fabrication stages, constructed in accordance with some embodiments.

DETAILED DESCRIPTION

Figure 1A:
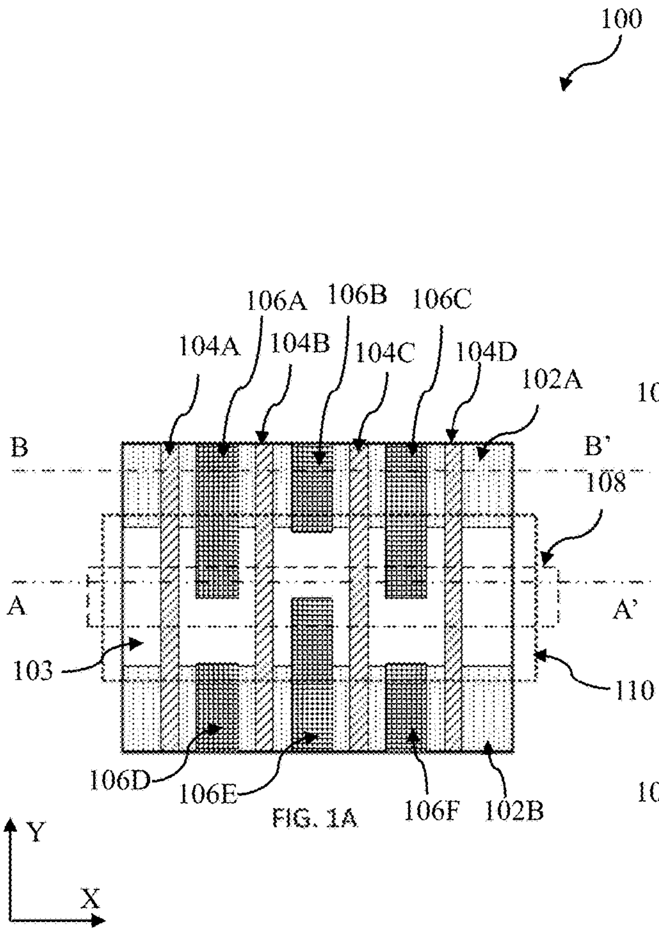
FIG. 1A is a top view of a semiconductor structure in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. For example, if the device in the figures is turned over, elements described as being “below” or “beneath” other elements or features would then be oriented “above” the other elements or features. Thus, the exemplary term “below” can encompass both an orientation of above and below. The apparatus may be otherwise oriented (rotated 90 degrees or at other orientations) and the spatially relative descriptors used herein may likewise be interpreted accordingly.

The present disclosure is directed to, but not otherwise limited to, a field-effect transistor (FET) device. The FET device, for example, may be a complementary metal-oxide-semiconductor (CMOS) device including a P-type metal-oxide-semiconductor (PMOS) FET device and an N-type metal-oxide-semiconductor (NMOS) FET device. The FET may be two-dimensional (planar FET) or three-dimensional, such as a fin-type FET (FinFET). The following disclosure will continue with a FinFET example to illustrate various embodiments of the present invention. It is understood, however, that the application should not be limited to a particular type of device, except as specifically claimed.

Figure 1B:
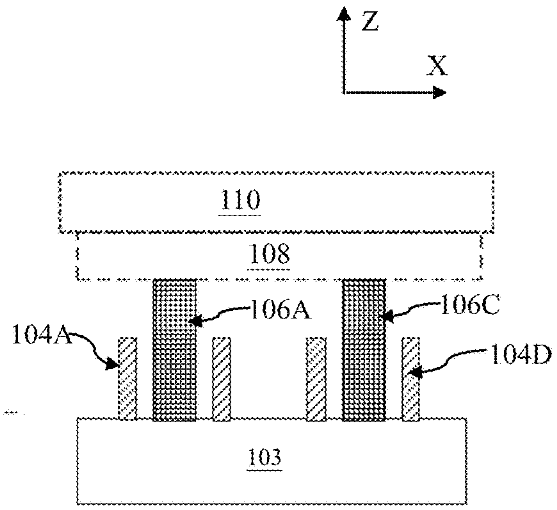
FIGS. 1B and 1C are sectional views of the semiconductor structure of FIG. 1A, along AA' and BB' dashed lines, respectively, in accordance with some embodiments.
Figure 1C:
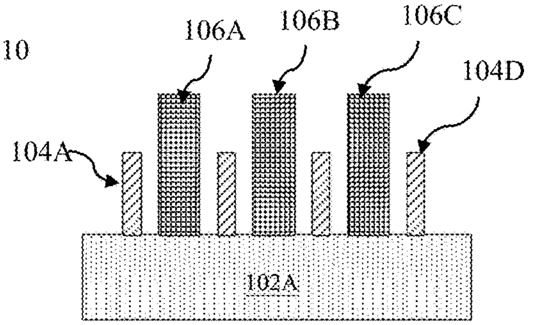

FIG. 1A is a top view of a semiconductor structure 100; and FIGS. 1B and 1C are sectional views of the semiconductor structure 100 along AA' and BB' directions, respectively, constructed in accordance with some embodiments. The semiconductor structure 100 includes a semiconductor substrate having various active regions (such as 102A and 102B) separated by isolation features 103. Various devices, such as FETs are formed on the active regions. Each of the active regions includes an elongated shape, such as rectangle, oriented in a first direction (X direction). Various gate stacks, such as gate stacks 104A, 104B 104C and 104D, for FETs are formed on the active regions. Each of the gate stacks includes an elongated shape, such as rectangle, oriented in a second direction (Y direction) that is perpendicular to the first direction. The vertical direction is Z direction, which is perpendicular to the surface of the semiconductor substrate, defined by XY plane. Various source/drain features (not shown) are formed on the fin active regions and are configured with respective gate stacks to form FETs. The semiconductor structure 100 further includes conductive features (also referred to as conductive contact features) 106 formed on the semiconductor substrate and configured to land on the source/drain features. In the present example, the conductive contact features 106 include exemplary conductive contact features 106A, 106B, 106C, 106D, 106E and 106F. In furtherance of the present example, the conductive contact features 106A, 106B and 106C land on and directly contact respective source/drain features on the active region 102A, while the conductive contact features 106D, 106E and 106F land on and directly contact respective source/drain features on the active region 102B. A conductive feature (referred to as conductive via feature) 108 is disposed on the semiconductor substrate and is configured to directly connect to the conductive contact features 106A, 106C and 106E. The conductive via feature 108 is a power rail configured to provide power (such as a high power Vdd or a low power Vss) to source/drain features in the semiconductor substrate. Additional interconnection structure, including various metal lines and via features, is formed on the semiconductor substrate and is configured to couple various FETs into a functional circuit. Particularly, the interconnection structure includes a metal line 110 configured to land on the conductive via feature 108, as illustrated in FIG. 1B.

Figure 2A:
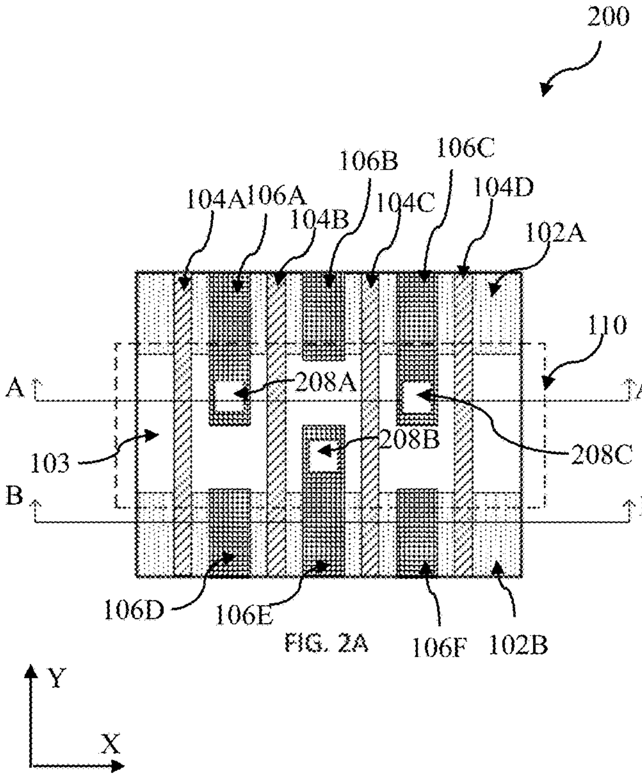
FIG. 2A is a top view of a semiconductor structure in accordance with some embodiments.
Figure 2B:
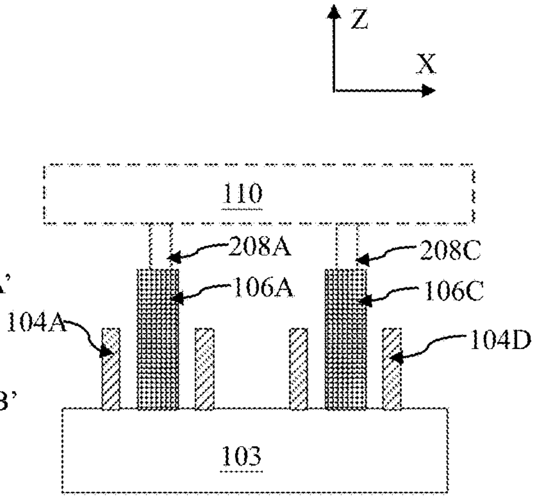
FIGS. 2B and 2C are sectional views of the semiconductor structure of FIG. 2A, along AA' and BB' dashed lines, respectively, in accordance with some embodiments.
Figure 2C:
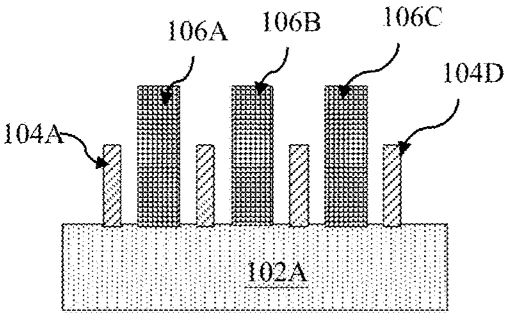

FIG. 2A is a top view of a semiconductor structure 200; and FIGS. 2B and 2C are sectional views of the semiconductor structure 100 along AA' and BB' directions, respectively, constructed in accordance with some embodiments. The semiconductor structure 200 includes a semiconductor substrate having various active regions (such as 102A and 102B) separated by isolation features 103. Various devices, such as FETs are formed on the active regions. Each of the active regions includes an elongated shape, such as rectangle, oriented in a first direction (X direction). Various gate stacks, such as gate stacks 104A, 104B 104C and 104D, for FETs are formed on the active regions. Each of the gate stacks includes an elongated shape, such as rectangle, oriented in a second direction (Y direction) that is perpendicular to the first direction. The vertical direction is Z direction, which is perpendicular to the surface of the semiconductor substrate, defined by XY plane. Various source/drain features (not shown) are formed on the fin active regions and are configured with respective gate stacks to form FETs. The semiconductor structure 200 further includes conductive contact features 106 formed on the semiconductor substrate and configured to land on the source/drain features. In the present example, the conductive contact features 106 include exemplary conductive contact features 106A, 106B, 106C, 106D, 106E and 106F. In furtherance of the present example, the conductive contact features 106A, 106B and 106C land on and directly contact respective source/drain features on the active region 102A, while the conductive contact features 106D, 106E and 106F land on and directly contact respective source/drain features on the active region 102B. Three exemplary conductive via features 208A, 208B and 208C are formed on the semiconductor substrate and are configured to connect to the conductive contact features 106A, 106E and 106C, respectively. The conductive via features 208 are power rails configured to provide power (such as a high power Vdd or a low power Vss) to source/drain features in the semiconductor substrate. Additional interconnection structure, including various metal lines and via features, is formed on the semiconductor substrate and is configured to couple various FETs into a functional circuit. Particularly, the interconnection structure includes a metal line 110 configured to land on and electrically connect to the conductive via features 208A, 208B and 208C, as illustrated in FIG. 2B.

Figure 3A:
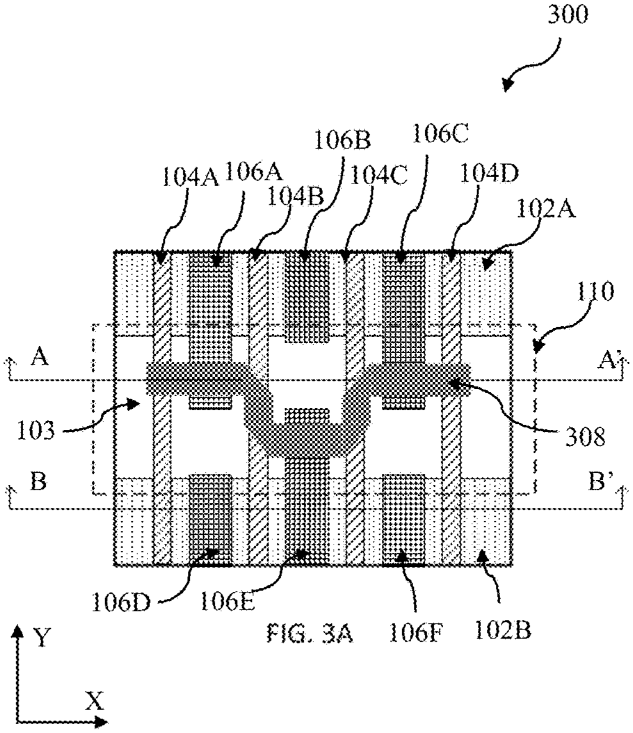
FIG. 3A is a top view of a semiconductor structure in accordance with some embodiments.
Figure 3B:
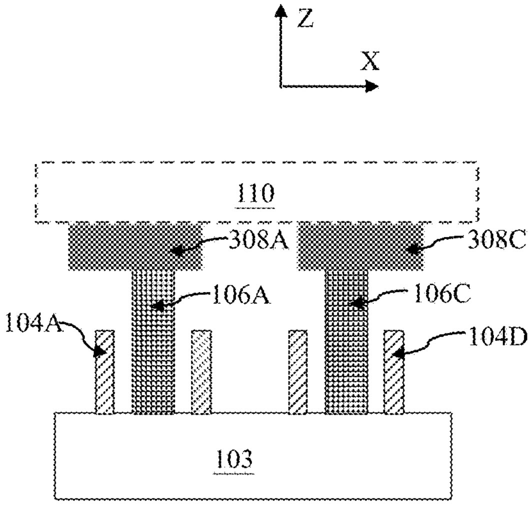
FIGS. 3B and 3C are sectional views of the semiconductor structure of FIG. 3A, along AA' and BB' dashed lines, respectively, in accordance with some embodiments.
Figure 3C:
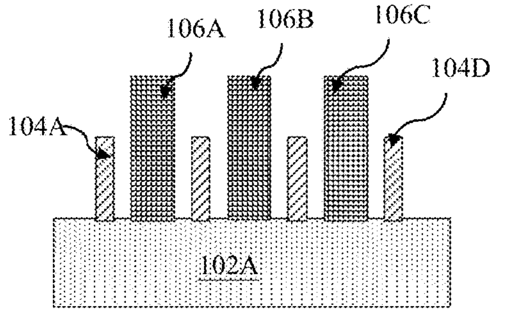

FIG. 3A is a top view of a semiconductor structure 300; and FIGS. 3B and 3C are sectional views of the semiconductor structure 300 along AA' and BB' directions, respectively, constructed in accordance with some embodiments. The semiconductor structure 300 includes a semiconductor substrate having various active regions (such as 102A and 102B) separated by isolation features 103. Various devices, such as FETs are formed on the active regions. Each of the active regions includes an elongated shape, such as rectangle, oriented in a first direction (X direction). Various gate stacks, such as gate stacks 104A, 104B 104C and 104D, for FETs are formed on the active regions. Each of the gate stacks includes an elongated shape, such as rectangle, oriented in a second direction (Y direction) that is perpendicular to the first direction. The vertical direction is Z direction, which is perpendicular to the surface of the semiconductor substrate, defined by XY plane. Various source/drain features (not shown) are formed on the fin active regions and are configured with respective gate stacks to form FETs. The semiconductor structure 300 further includes conductive contact features 106 formed on the semiconductor substrate and configured to land on the source/drain features. In the present example, the conductive contact features 106 include exemplary conductive contact features 106A, 106B, 106C, 106D, 106E and 106F. In furtherance of the present example, the conductive contact features 106A, 106B and 106C land on and directly contact respective source/drain features on the active region 102A, while the conductive contact features 106D, 106E and 106F land on and directly contact respective source/drain features on the active region 102B. A curved conductive via feature 308 is formed on the semiconductor substrate and is configured to connect to the conductive contact features 106A, 106E and 106C, respectively. Particularly, the conductive via feature 308 is designed to have an S-curved shape. The S-curved shape includes at least one edge oriented in a tilted direction, which is different from the first and second directions (X and Y directions). This design with S-curved shape having a tilted edge provides a conductive structure to properly connect to intended conductive contact features with enough contact area (overlapping target) and to distance from unintended conductive contact features with enough clearance (spacing target). The conductive via feature 308 is a power rail configured to provide power (such as a high power Vdd or a low power Vss) to source/drain features in the semiconductor substrate. Additional interconnection structure, including various metal lines and via features, is formed on the semiconductor substrate and is configured to couple various FETs into a functional circuit. Particularly, the interconnection structure includes a metal line 110 configured to land on the conductive via feature 308, as illustrated in FIG. 3B.

Figure 4:
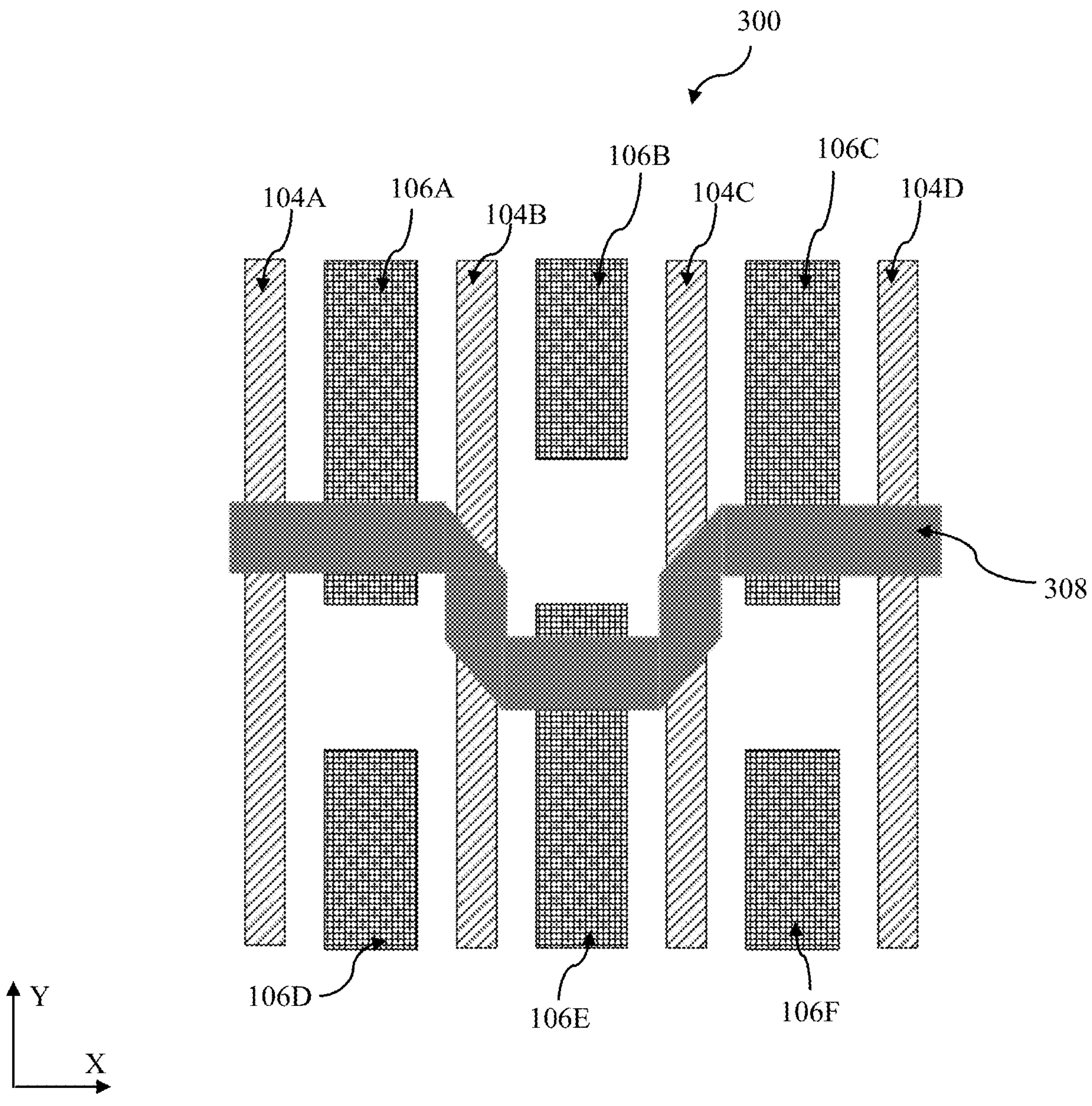
FIG. 4 is a top view of the semiconductor structure of FIG. 3A, in portion, constructed according to some embodiments.
Figure 5A:
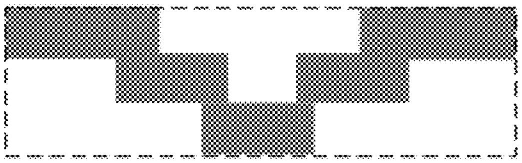
FIGS. 5A, 5B, 5C and 5D are sectional views of a conductive via feature in the semiconductor structure of FIG. 4 in accordance with some embodiments.
Figure 5B:
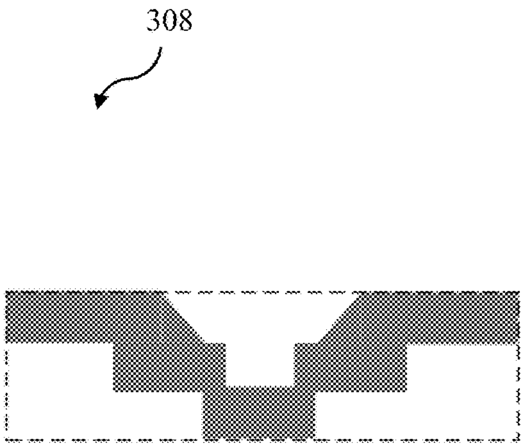
Figure 5C:
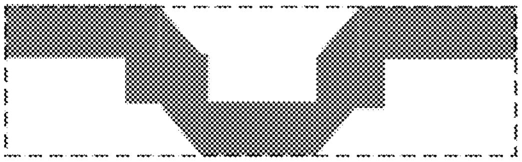
Figure 5D:
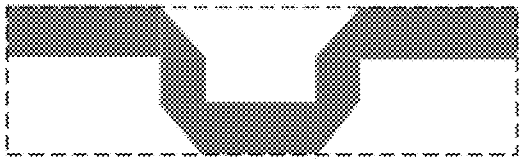

The semiconductor structure 300 is further constructed in portion in FIG. 4 while the active regions 102 and the metal line 110 are eliminated for simplicity. In the present embodiment, the metal contact features 106 are divided to two groups (or two subsets) according to the relationship to the conductive via feature 308. The first group of the conductive contact features includes conductive contact features 106A, 106C and 106E, those being intended to be directly connected to the conductive via feature 308 according to the design. The second group of the conductive contact features includes conductive contact features 106B, 106D and 106F, those being intended to be distanced from the conductive via feature 308 according to the design. The S-curved shape of the conductive via feature 308 is a continuous feature with various shifting and deformation to have proper relationships to the two groups of the conductive contact features. The conductive via feature 308 having the S-curved shape is constructed according to various rules, which will be described later, to land on the first group of the conductive contact features satisfying the overlapping target and be distanced from the second group of the conductive contact features satisfying the spacing target. To achieve this, the S-curved shape includes various polygons, such as squares with different sizes, rectangles with different widths and lengths, tilted rectangles with different angles, triangles, trapezoids, diamonds, and parallelograms. Various exemplary S-curved shapes of the conductive via feature 308 are illustrated in FIGS. 5A, 5B, 5C and 5D in accordance with some embodiments. Usually, the original IC design from the designer cannot meet those criteria (such as the overlapping target and spacing target) due to not knowing enough of the manufacturing capability and un-efficiency of the communication between the designers and manufacture. The following method provides a proper way to modify the IC design to meet the manufacturing rules.

Figure 7:
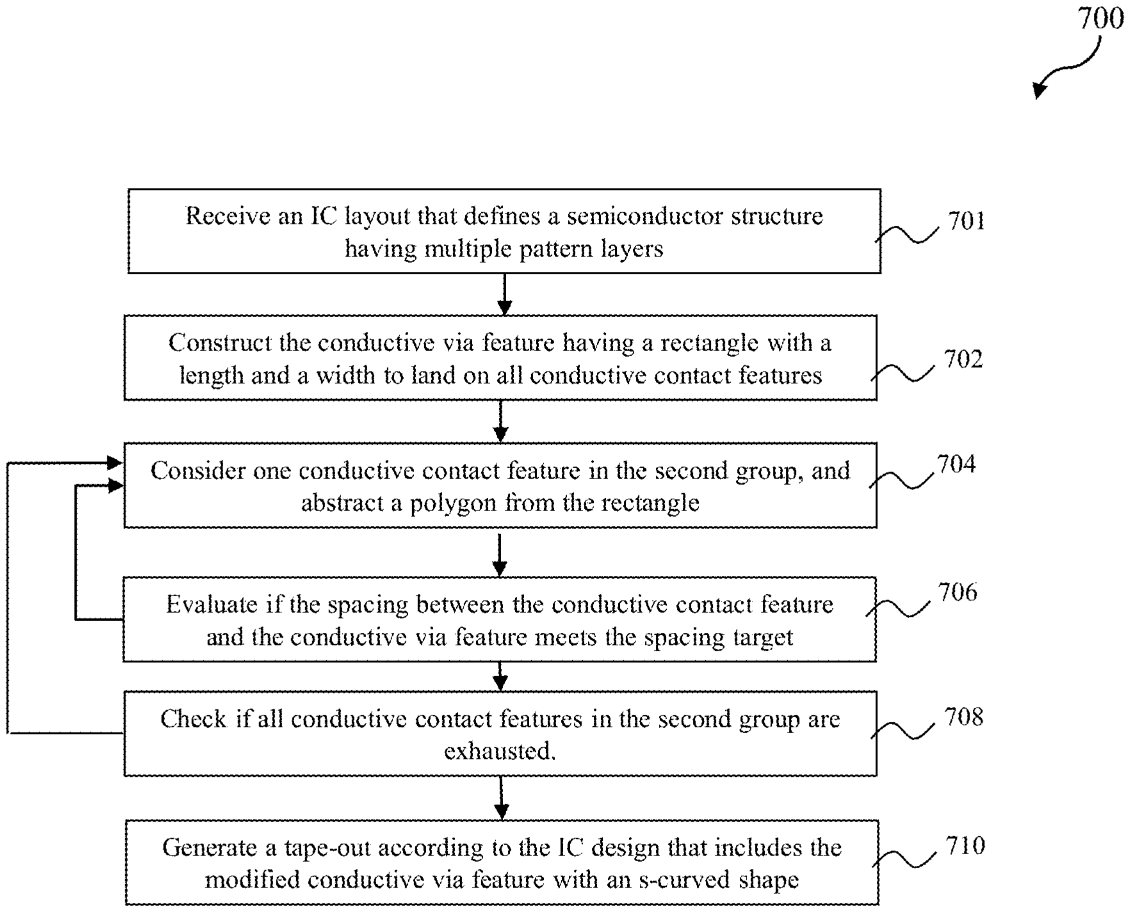
FIG. 7 is a flowchart of an integrated circuit fabrication method in accordance with some embodiments.

FIG. 7 provides a flowchart 700 for constructing the conductive via feature 308 according to some embodiments with the abstract rules. FIGS. 6A, 6B, 6C, 6D and 6E are the shapes of the conductive via feature 308 at various steps. In the following description, the IC design of the semiconductor structure 100 still use the IC design in FIGS. 3A-3C and FIG. 4 for various features (including active regions 102, gate stacks 104 and other features) and respective spatial relationships.

Referring to FIG. 7, the method 700 begins at a block 701 by receiving an IC layout for a semiconductor structure having multiple pattern layers, such as those illustrated in FIGS. 3A-3C. For examples, the IC layout includes a first pattern layer defining active regions 102; a second pattern layer defining gate stacks 104; a third pattern layer defining conductive contact features 106 landing on respective active regions; and a fourth pattern layer defining a conductive via feature 308 landing on a subset (or the first group) of the conductive contact features 106. Additional pattern layers may be present in the IC layout. For example, an interconnection structure, including various metal lines and via features in respective pattern layers, is formed on the semiconductor substrate and is configured to couple various FETs into a functional circuit.

Referring to FIGS. 7 and 6A, the method 700 proceeds to an operation 702 by constructing the conductive via feature having a rectangle with a length and a width to land on all conductive contact features satisfying the overlapping target. In the present example, the rectangle is oriented with its length in the first direction (X direction), as illustrated in FIG. 6A. This rectangle is referred to as an initial rectangle.

Referring to FIGS. 7 and 6B, the method 700 proceeds to an operation 704 by considering one conductive contact feature from the second group, and abstracting a polygon from the initial rectangle. Especially, the abstraction of the polygon is from the location of the overlapping region between the initial rectangle of the conductive via feature and the considered conductive contact feature. The dimensions of the polygon may be evaluated and determined according to certain rules, such as the overlapping area plus the spacing. The polygon can be a polygon with any number of sides, such as a square, a rectangle, a triangle, a trapezoid, a diamonds, and a parallelogram. Edges of the polygon can be in any angle including a tilted angle different from the X and Y directions. For example, the conductive contact feature 106D is considered and a polygon is abstracted from the overlapping region. In the case, the polygon is a rectangle. After the abstraction at the operation 704, the shape of the conductive via feature is illustrated in FIG. 6B Referring to FIG. 7, the method 700 proceeds to an operation 706 by evaluating if a lateral distance (or spacing) between the considered conductive contact feature (106D in this example) and the conductive via feature meets the spacing target. If not, move back to the operation 704 by abstracting another polygon from the conductive via feature. If it meets the spacing target, the method 700 moves forward to the following operation 708. The method 700 will iterates until the spacing target is reached.

Referring to FIGS. 7, the method 700 proceeds to an operation 708 by check if all conductive contact features in the second group are exhausted. If not, the method 700 moves back to the operation 704 for another conductive contact feature in the second group. For example, consider another conductive contact feature 106F in the second group and abstract another polygon (such as a rectangle) from the conductive via feature, resulting in a curved shape as illustrated in FIG. 6C. For another example, consider yet another conductive contact feature 106B in the second group and abstract another polygon (such as a rectangle) from the conductive via feature, resulting in an S-curved shape as illustrated in FIG. 6D. Furthermore, if the spacing target is still not reached yet, another polygon is abstracted from the conductive via feature 308. For examples, if the conductive contact feature 106D and the conductive via feature 308 have not enough spacing, another polygon (such as a triangle) is abstracted. For another example, if the conductive contact feature 106F and the conductive via feature 308 have not enough spacing, another polygon, such as a triangle, is abstracted, and so on, resulting in conductive via feature 308 having an S-curved shape as illustrated in FIG. 6E. Particularly, the S-curved shape 308 in FIG. 6E has one or more tilted edges, such as edges 602, 604 and other tilted edges, each having a respective tilted angle different from the X and Y directions.

Referring to FIG. 7, the method 700 may include other operations, such as an operation 710 to generate a tape-out for mask making according to thus modified IC design, which includes the conductive via feature 308 having an S-curved shape, which further has at least one tilted edge. The tape-out defines the modified IC design to be formed on photomasks for wafer fabrication or to be directly transferred to semiconductor wafers by direct writing techniques, such as electron-beam direct writing. The tape-out of the modified IC design includes various pattern layers (such as a layer of active regions, a layer of gate stacks and so on) and spatial relationships among those pattern layers, especially various shapes and sizes of various pattern features in each pattern layer. The method 700 may further include making photomasks according to the tape-out that defines the modified IC design having a conductive via feature 308 with an S-curved shape.

Figure 8A:
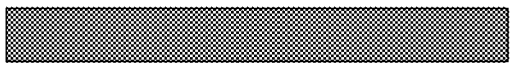
FIGS. 8A, 8B, 8C, 8D and 8E are sectional views of the conductive via feature in the semiconductor structure of FIG. 4 at various fabrication stages, constructed in accordance with some embodiments.
Figure 8B:
Figure 8C:
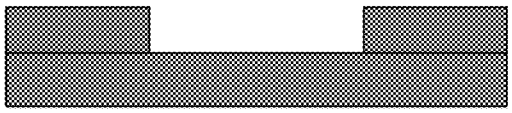
Figure 8D:
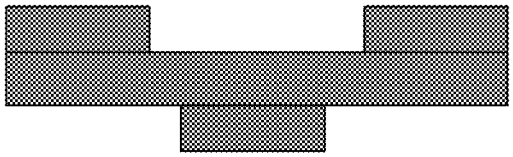
Figure 8E:
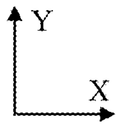
Figure 8E:
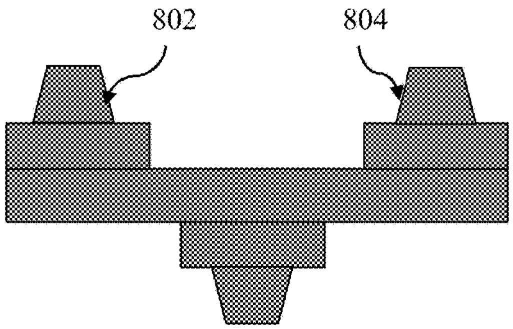
Figure 9:
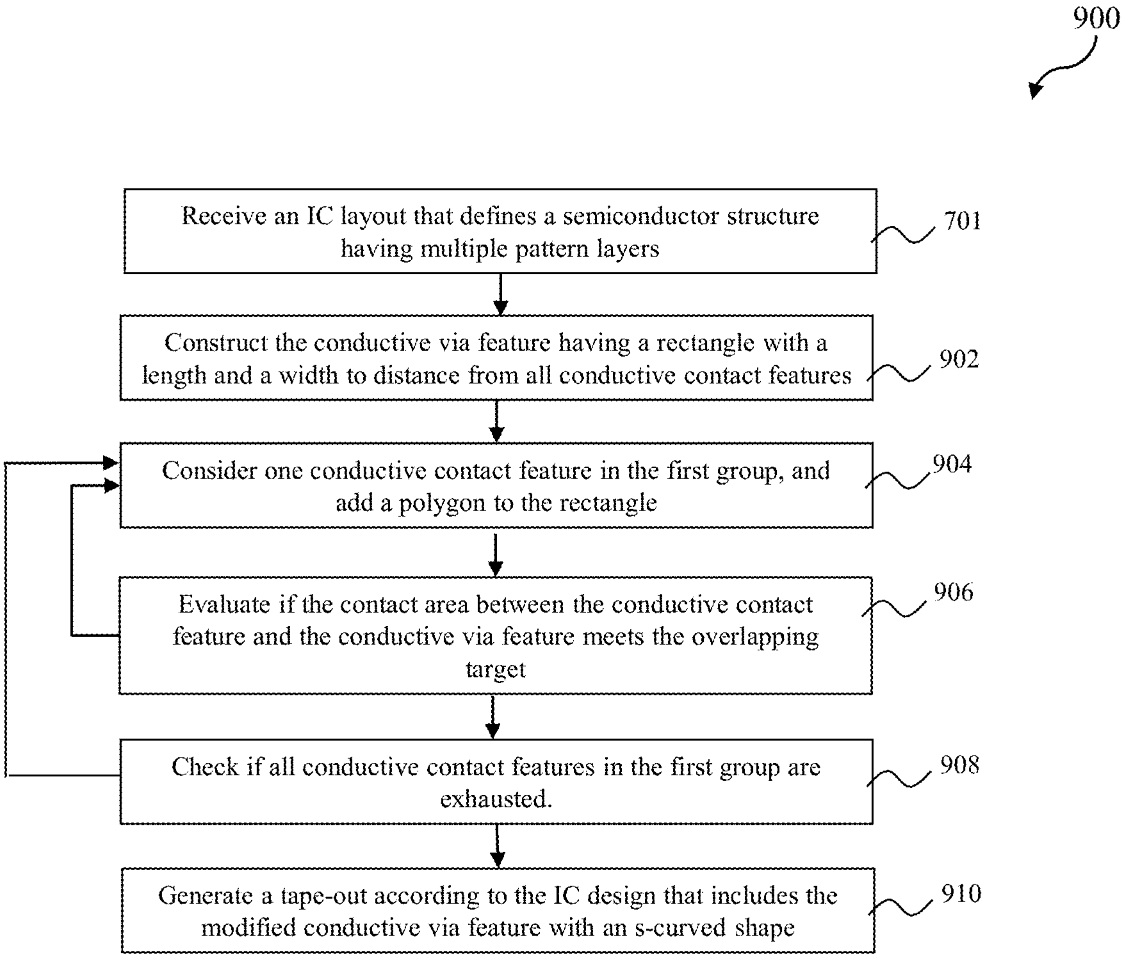
FIG. 9 is a flowchart of an integrated circuit fabrication method in accordance with some embodiments.

FIG. 9 provides a flowchart 900 for constructing the conductive via feature 308 according to some embodiments with the addition rules. FIGS. 8A, 8B, 8C, 8D and 8E are the shapes of the conductive via feature 308 at various steps. In the following description, the IC design of the semiconductor structure 100 is still use the IC design in FIGS. 3A-3C and FIG. 4 for various features (including active regions 102, gate stacks 104 and other features) and respective spatial relationships.

Referring to FIG. 9, the method 900 begins at a block 701 by receiving an IC layout for a semiconductor structure having multiple pattern layers. For examples, the IC layout includes a first pattern layer defining active regions 102; a second pattern layer defining gate stacks 104; a third pattern layer defining conductive contact features landing on respective active regions; and a fourth pattern layer defining a conductive via feature landing on a subset of the conductive contact features, such as those illustrated in FIGS. 3A-3C. Additional pattern layers may present in the IC layout.

Referring to FIGS. 9 and 8A, the method 900 proceeds to an operation 902 by constructing the conductive via feature having a rectangle with a length and a width small enough so that not landing on any of the conductive contact features or distancing from any of the conductive contact features with a lateral distance satisfying the spacing target, which means that the lateral distance is equal to or greater than the spacing target. In the present example, the rectangle is oriented with its length in the first direction (X direction), as illustrated in FIG. 8A. This rectangle is referred to as an initial rectangle.

Referring to FIGS. 9 and 8B, the method 900 proceeds to an operation 904 by considering one conductive contact feature from the first group, and adding a polygon to the initial rectangle. Especially, the addition of the polygon is to the location of the considered conductive contact feature such that the modified conductive via feature will overlap with the considered conductive contact feature. The dimensions of the polygon may be evaluated and determined according to certain rules, such as the existing spacing plus the overlapping target. The polygon can be a polygon with any number of sides, such as a square, a rectangle, a triangle, a trapezoid, a diamonds, and a parallelogram. Edges of the polygon can be in any angle including a tilted angle different from the X and Y directions. For example, the conductive contact feature 106A is considered and a polygon is added to the conductive via feature. In the case, the polygon is a rectangle. After the addition at the operation 904, the shape of the conductive via feature is illustrated in FIG. 8B Referring to FIGS. 9, the method 900 proceeds to an operation 906 by evaluating if the overlapping area between the considered conductive contact feature (106A in this example) and the conductive via feature meets the overlapping target. If not, move back to the operation 904 by adding another polygon to the conductive via feature. If it meets the overlapping target, the method 900 moves forward to the following operation 908 to check if all conductive contact features in the first group are exhausted. The method 900 will iterates until the overlapping target is reached.

Referring to FIGS. 9, the method 900 proceeds to an operation 908 by check if all conductive contact features in the first group are exhausted by the above operations. If not, the method 900 moves back to the operation 904 for another conductive contact feature in the first group. For example, consider another conductive contact feature 106C in the first group and add another polygon (such as a rectangle) to the conductive via feature, resulting in a curved shape as illustrated in FIG. 8C. For another example, consider another conductive contact feature 106E in the first group and add another polygon (such as a rectangle) to the conductive via feature, resulting in an S-curved shape as illustrated in FIG. 8D. Furthermore, if the overlapping target is not reached yet, another polygon is added to the conductive via feature 308. For examples, if the conductive contact feature 106A and the conductive via feature 308 have not enough contact area, another polygon (such as a trapezoid) is added to the conductive via feature. For another example, if the conductive contact feature 106C and the conductive via feature 308 have not enough contact area, another polygon (such as a trapezoid) is added, and so on, resulting in conductive via feature 308 having an S-curved shape as illustrated in FIG. 8E. Particularly, the S-curved shape 308 in FIG. 8E has one or more tilted edges, such as edges 802, 804 and other tilted edges, each having a respective tilted angle different from the X and Y directions. The tilted angle of the conductive via feature 308 is generated since a tilted polygon is added to increase the contact area and also to avoid violate the spacing target to the adjacent conductive contact features in the second group.

Referring to FIGS. 9, the method 900 may include other operations, such as an operation 910 to generate a tape-out for mask making according to thus modified IC design, which includes the conductive via feature having an S-curved shape, which further has at least one tilted edge. The tape-out defines the modified IC design to be formed on photomasks or to be directly transferred to semiconductor wafers by direct writing techniques, such as electron-beam direct writing. The tape-out of the modified IC design includes various pattern layers and spatial relationships among those pattern layers, especially various shapes and sizes of various pattern features in each pattern layer. The method 900 may further include making photomasks according to the tape-out that defines the modified IC design having a conductive via feature with an S-curved shape.

Figure 10:
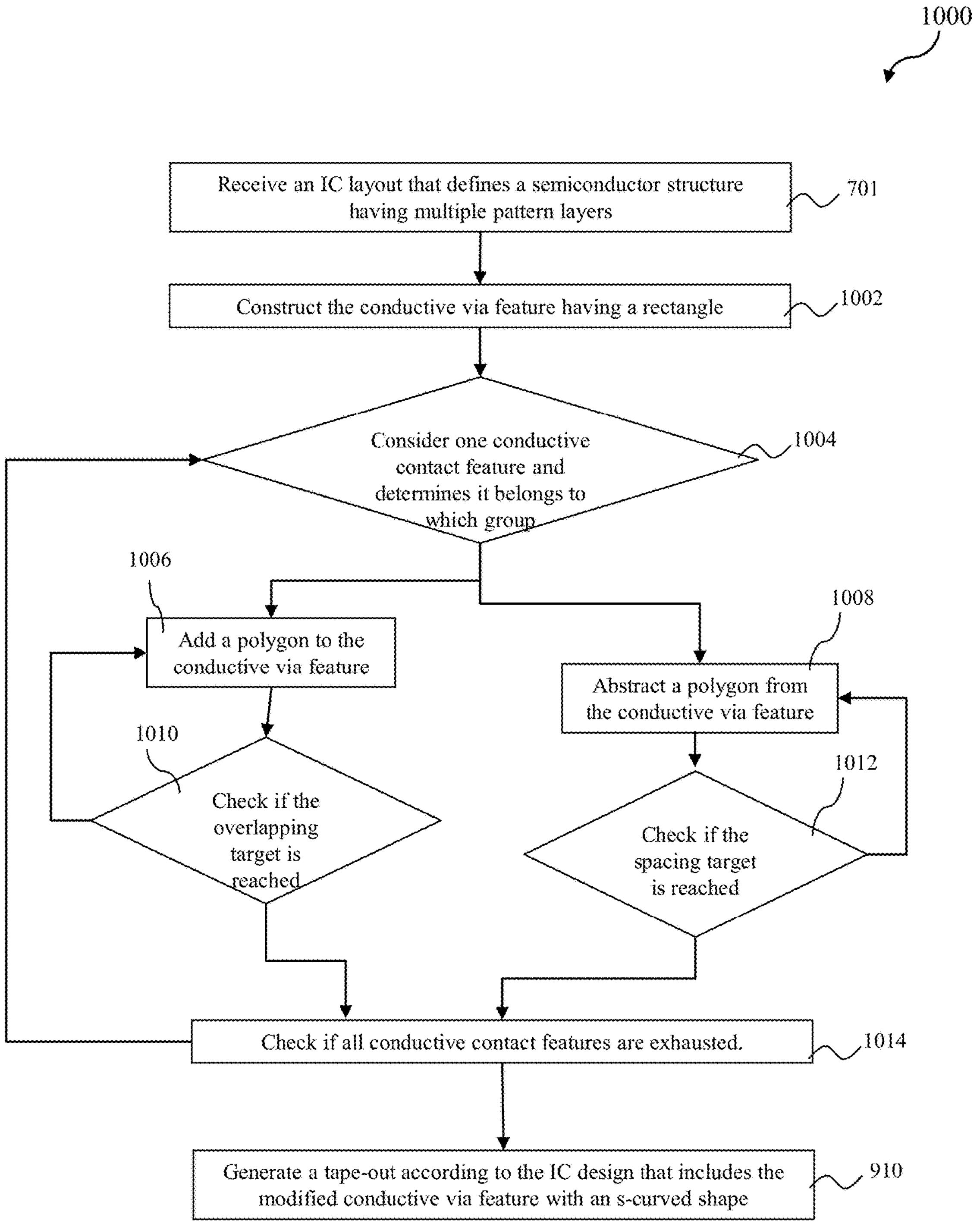
FIG. 10 is a flowchart of an integrated circuit fabrication method in accordance with some other embodiments.

FIG. 10 provides a flowchart 1000 for constructing the conductive via feature 308 in accordance with some embodiments. The method 1000 begins at a block 701 by receiving an IC layout for a semiconductor structure having multiple pattern layers. For examples, the IC layout includes a first pattern layer defining active regions 102; a second pattern layer defining gate stacks 104; a third pattern layer defining conductive contact features landing on respective active regions; and a fourth pattern layer defining a conductive via feature landing on a subset of the conductive contact features, such as those illustrated in FIGS. 3A-3C. Additional pattern layers may present in the IC layout.

The method 1000 proceeds to an operation 1002 by constructing an initial shape of the conductive via feature. The initial shape may be a polygon or other proper shape. The initial shape may be a shape from the designer when the initial IC design is received from the designer. In one embodiment, the operation 1002 constructs the initial shape of the conductive via feature to have a rectangle with a length and a width to land on all conductive contact features satisfying the overlapping target. In another embodiment, the operation 1002 constructs the initial shape of the conductive via feature to have a rectangle with a length and a width small enough so that not landing on any of the conductive contact features or distancing from each of the conductive contact features with a lateral distance satisfying the spacing target.

The method 1000 proceeds to an operation 1004 by considering one conductive contact feature and determine which group it belongs to. In the operation 1004, a spatial parameter between the conductive via feature and the considered conductive contact feature is evaluated. This spatial relationship defines if the two are connected or distanced away according to the IC layout. Accordingly, the conductive contact features are divided into two groups. The first group includes all conductive contact features to be contacted with the conductive via feature. The second group includes all conductive contact features to be distanced from the conductive via feature. If the considered conductive contact feature belongs to the first group, proceeds to an operation 1006. If it belongs to the second group, proceeds to an operation 1008.

At the operation 1004, when the considered conductive contact feature is from the first group, the method 1000 proceeds to an operation 1006. At the operation 1006, a polygon is added to the conductive via feature. Especially, the addition of the polygon is to the location of the considered conductive contact feature such that the modified conductive via feature will overlap with the considered conductive contact feature. The dimensions of the polygon may be evaluated and determined according to certain rules, such as the existing spacing plus the overlapping target. The polygon can be a polygon with any number of sides, such as a square, a rectangle, a triangle, a trapezoid, a diamond, and a parallelogram. Edges of the polygon can be in any angle including a tilted angle different from the X and Y directions. For example, the conductive contact feature 106A is considered and a polygon is added to the conductive via feature.

The method 1000 proceeds to an operation 1010 by evaluating if the overlapping area between the considered conductive contact and the conductive via feature meets the overlapping target. If not, move back to the operation 1006 by adding another polygon to the conductive via feature. The method 1000 will iterates until the overlapping target is reached. If it meets the overlapping target, the method 1000 moves forward to the following operation 1014. In the operations 1006 and 1010, the spacing rule may be also considered. When adding a polygon causes a lateral distance between the conductive via feature 308 and an adjacent conductive contact feature of the second group is reduced, a tilted polygon may be added to both meet the overlapping target and the spacing target.

At the operation 1004, when the considered conductive contact feature belongs to the second group, the method 1000 proceeds to an operation 1008. At the operation 1008, a polygon is abstracted from the conductive via feature. Especially, the abstraction of the polygon is from the location of the considered conductive contact feature such that the modified conductive via feature will distanced from the considered conductive contact feature such that a lateral distance therebetween is equal to or greater than the spacing target. The dimensions of the polygon may be evaluated and determined according to certain rules, such as the existing overlapping plus the spacing target. The polygon can be a polygon with any number of sides, such as a square, a rectangle, a triangle, a trapezoid, a diamond, and a parallelogram. Edges of the polygon can be in any angle including a tilted angle different from the X and Y directions.

The method 1000 proceeds to an operation 1012 by evaluating if the spacing between the considered conductive contact and the conductive via feature meets the spacing target. If not, move back to the operation 1008 by abstracting another polygon from the conductive via feature. The method 1000 will iterates until the spacing target is reached. If it meets the spacing target, the method 1000 moves forward to the following operation 1014. In the operations 1008 and 1012, the overlapping rule may be also considered. When abstracting a polygon causes an overlapping area between the conductive via feature 308 and an adjacent conductive contact feature of the first group is reduced, a tilted polygon may be abstracted to both meet the spacing target and the overlapping target.

The operation 1014 includes checking if all conductive contact features (both in the first group and the second group) are exhausted by the above operations. If not, the method 1000 moves back to the operation 1004 for another conductive contact feature. Thus, the conductive via feature 308 ends up with an S-curved shape having one or more tilted edges each with a respective tilted angle different from the X and Y directions.

The method 1000 may include other operations, such as an operation 910 to generate a tape-out for mask making according to thus modified IC design, which includes a conductive via feature having an S-curved shape, which further has at least one tilted edge. The tape-out defines the modified IC design to be formed on photomasks or to be directly transferred to semiconductor wafers by direct writing techniques, such as electron-beam direct writing. The tape-out of the modified IC design includes various pattern layers and spatial relationships among those pattern layers, especially various shapes and sizes of various pattern features in each pattern layer. The method 900 may further include making photomasks according to the tape-out that defines the modified IC design having a conductive via feature with an S-curved shape. The method 900 may further include making semiconductor wafers using the photomasks.

Figure 11A:
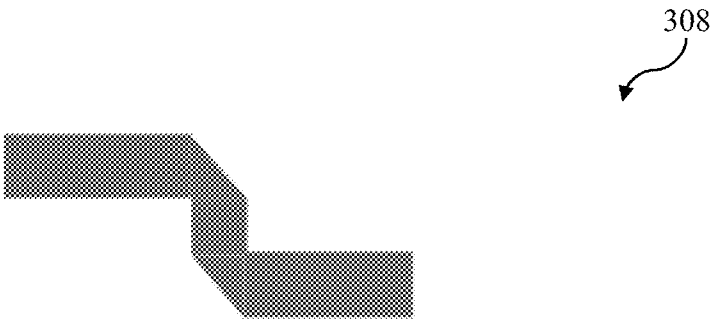
FIGS. 11A, 11B and 11C are sectional views of the conductive via feature in the semiconductor structure of FIG. 4 at various fabrication stages, constructed in accordance with some embodiments.
Figure 11B:
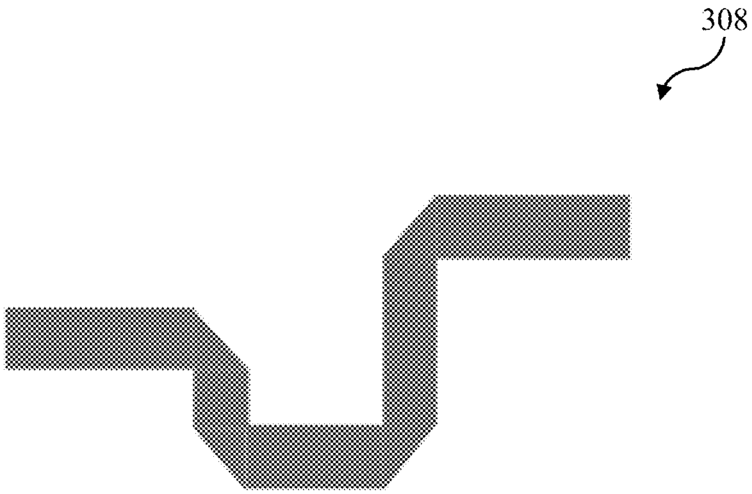
Figure 11C:
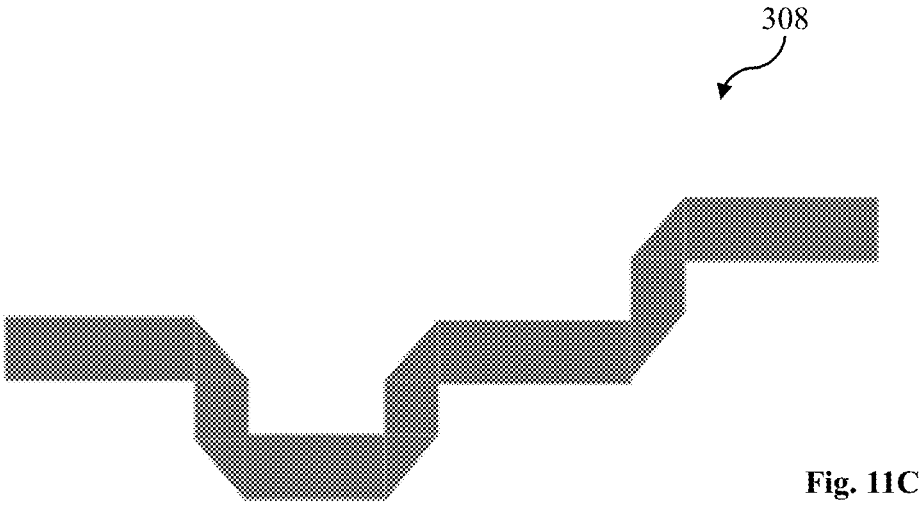

Various embodiments of an IC design for the semiconductor structure and the method making the same are provided. Other embodiments may present within the scope of the present disclosure. For example, the method 700 may begin with an initial shape, and then adding a polygon to reach another conductive contact feature in the first group in a way (in term of shape, size, and tilted angle) be distanced away from an adjacent conductive contact features in the second group. This procedure is continued until the conductive via feature lands on all conductive contact features in the first group with enough contact area (meeting the overlapping target) and is distanced away from all conductive contact features in the second group with enough spacing (meeting the spacing target). At one step, the exemplary conductive via feature 308 is illustrated in FIG. 11A. After adding a few more additional polygons, the exemplary conductive via feature 308 is extended, as illustrated in FIG. 11B. After a few more cycles in the iteration of adding polygon, the exemplary conductive via feature 308 is further extended, as illustrated in FIG. 11C.

The present disclosure provides an IC layout for a semiconductor structure and a method making the same. The semiconductor structure includes a conductive via feature landing on a subset of conductive contact features in the underlying conductive layer to coupling various source/ drain features of FETs in the active regions. The conductive via feature in the IC layout for the semiconductor structure is designed to have an S-curved shape. The S-curved shape includes at least one edge oriented in a tilted direction, which is different from the standard directions, such as the orientation of the elongate gate stacks and the orientation of the elongated fin active regions.

The embodiments of the present disclosure offer advantages over existing art, though it is understood that other embodiments may offer different advantages, not all advantages are necessarily discussed herein, and that no particular advantage is required for all embodiments. By utilizing the disclosed method and structure, the S-curved shape of the conductive via feature provide freedom and flexibility to land on the intended conductive contact features with enough contact areas and distanced away from the unintended conductive contact features with enough clearance.

Thus, the present disclosure provides a method for fabricating an integrated circuit (IC). The method includes receiving an IC layout having active regions, conductive contact features landing on the active regions, and a conductive via feature to be landing on a first subset of the conductive contact features and to be spaced from a second subset of the conductive contact features; evaluating a spatial parameter of the conductive via feature to the conductive contact features; and modifying the IC layout according to the spatial parameter such that the conductive via feature has a S-curved shape.

The present disclosure provides a method for fabricating an integrated circuit (IC). The method includes receiving an IC layout having a first pattern layer, a second pattern layer, and a third pattern layer to be formed on respective material layers of a semiconductor substrate. The first pattern layer includes a first active region and a second active region both having elongated shapes oriented in a first direction. The second pattern layer includes a plurality of conductive contact features having an elongated shape oriented in a second direction being orthogonal to the first direction, wherein the conductive contact features lands on the first and second active regions. The third pattern layer includes a conductive via feature landing on the conductive contact features. The method further includes constructing an initial shape of the conductive via feature; and modifying the initial shape of the conductive via feature to a modified shape that is overlapped with a first subset of the conductive contact features and is distanced from a second subset of the conductive contact features. The modified shape has a S-curved polygon with an edge oriented in a tilted direction being different from the first and second directions.

The present disclosure provides a method for fabricating an integrated circuit (IC). The method includes receiving an IC layout having a first pattern layer and a second pattern layer to be formed on respective material layers of a semiconductor substrate. The first pattern layer includes first conductive contact features and second conductive contact features spaced along a first direction, each of the first and second contact features having an elongated shape oriented in a second direction orthogonal to the first direction. The second pattern layer includes a conductive via feature to be landing on the first the conductive contact features and to be distanced away from the second conductive contact features. The method further includes modifying the conductive via feature to a first polygon that is overlapped with the first conductive contact features and is distanced from the second conductive contact features. The first polygon has an edge oriented in a tilted direction being different from the first and second directions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:

first and second active regions extending lengthwise along a first direction over a substrate;

an isolation feature over the substrate and separating the first and second active regions;

first source/drain (S/D) features over first S/D regions of the first and second active regions;

second S/D features over second S/D regions of the first and second active regions;

first and second S/D contacts directly landing on the first and second S/D features, respectively; and a conductive via feature directly landing on the first S/D contacts without landing on the second S/D contacts, wherein the conductive via feature has an S-curved shape and continuously extends across multiple first S/D contacts from a top view.

2. The semiconductor structure of claim 1, wherein the S-curved shape includes various polygons such as squares, triangles, trapezoids, diamonds, or parallelograms.

3. The semiconductor structure of claim 1, further comprising a metal line landing on the conductive via feature.

4. The semiconductor structure of claim 1, wherein the conductive via feature includes one or more tilted edges extending in a direction different from the first direction and different from a second direction perpendicular to the first direction.

5. The semiconductor structure of claim 1, further comprising:

gate structures extending lengthwise over channel regions of the first and the second active regions, wherein each of the gate structures are disposed laterally between one of the first S/D contacts and one of the second S/D contacts along the first direction.

6. The semiconductor structure of claim 5, wherein top surfaces of the first and the second S/D contacts are above top surfaces of the gate structures.

7. The semiconductor structure of claim 5, wherein a portion of the conductive via feature vertically overlaps with portions of the gate structures from a top view.

8. The semiconductor structure of claim 1, wherein at least one end of each of the first S/D contacts extend beyond at least one end of each of the second S/D contacts.

9. The semiconductor structure of claim 1, wherein from a top view and along a second direction perpendicular to the first direction, the conductive via feature is disposed between second S/D contacts disposed on opposing sides of the conductive via feature.

10. A semiconductor structure, comprising:

first and second active regions extending lengthwise along a first direction over a substrate;

an isolation feature over the substrate and separating the first and second active regions;

gate structures extending over channel regions of the first and the second active regions, the gate structures extending lengthwise along a second direction perpendicular to the first direction;

first source/drain (S/D) features over first S/D regions of the first and second active regions;

second S/D features over second S/D regions of the first and second active regions;

first and second S/D contacts directly landing on the first and second S/D features, respectively; and a conductive via feature continuously extending over and across one or more of the gate structures, wherein the conductive via feature directly contacts multiple first S/D contacts without contacting any of the second S/D contacts, wherein the conductive via feature include first portions that extend along the first direction and second portions that extend along the second direction.

11. The semiconductor structure of claim 10, wherein the first portions of the conductive via feature are in direct contact with the first S/D contacts.

12. The semiconductor structure of claim 10, wherein the second portions of the conductive via feature are disposed directly above and isolated from the gate structures.

13. The semiconductor structure of claim 10, wherein the second portions of the conductive via feature include slanted sidewalls extending along a direction different from the first and the second directions.

14. The semiconductor structure of claim 10, further comprising a metal line directly landing on the conductive via feature.

15. The semiconductor structure of claim 14, wherein the metal line completely overlaps the conductive via feature from a top view.

16. A semiconductor structure, comprising:

first and second active regions extending lengthwise along a first direction over a substrate;

an isolation feature over the substrate and separating the first and second active regions;

gate structures extending over channel regions of the first and the second active regions, the gate structures extending lengthwise along a second direction perpendicular to the first direction;

first source/drain (S/D) features over first S/D regions of the first and second active regions;

second S/D features over second S/D regions of the first and second active regions;

first and second S/D contacts directly landing on the first and second S/D features, respectively; and a conductive via feature continuously extending across multiple first S/D contacts to electrically connect the multiple first S/D contacts together, wherein the conductive via electrically connects first S/D features of the first active region to first S/D features of the second active region, and wherein the conductive via feature is electrically isolated from the second S/D contacts.

17. The semiconductor structure of claim 16, wherein the conductive via feature have first portions directly landing on the multiple first S/D contacts and second portions disposed directly above and isolated from the gate structures.

18. The semiconductor structure of claim 17, wherein the first portions extend lengthwise along the first direction and the second portions extend lengthwise along the second direction.

19. The semiconductor structure of claim 18, wherein the second portions include slanted sidewalls extending along a direction different from the first and the second directions.

20. The semiconductor structure of claim 16, wherein the first and second S/D contacts have extending portions that extend directly above the isolation feature along the second direction, wherein a first length of each of the extending portions of the first S/D contacts is greater than a second length of each of the extending portions of the second S/D contacts.

* * * * *